Aug. 29, 1933.  A. W. MENDEL  1,924,286
ANTISKID CHAIN
Filed March 24, 1932
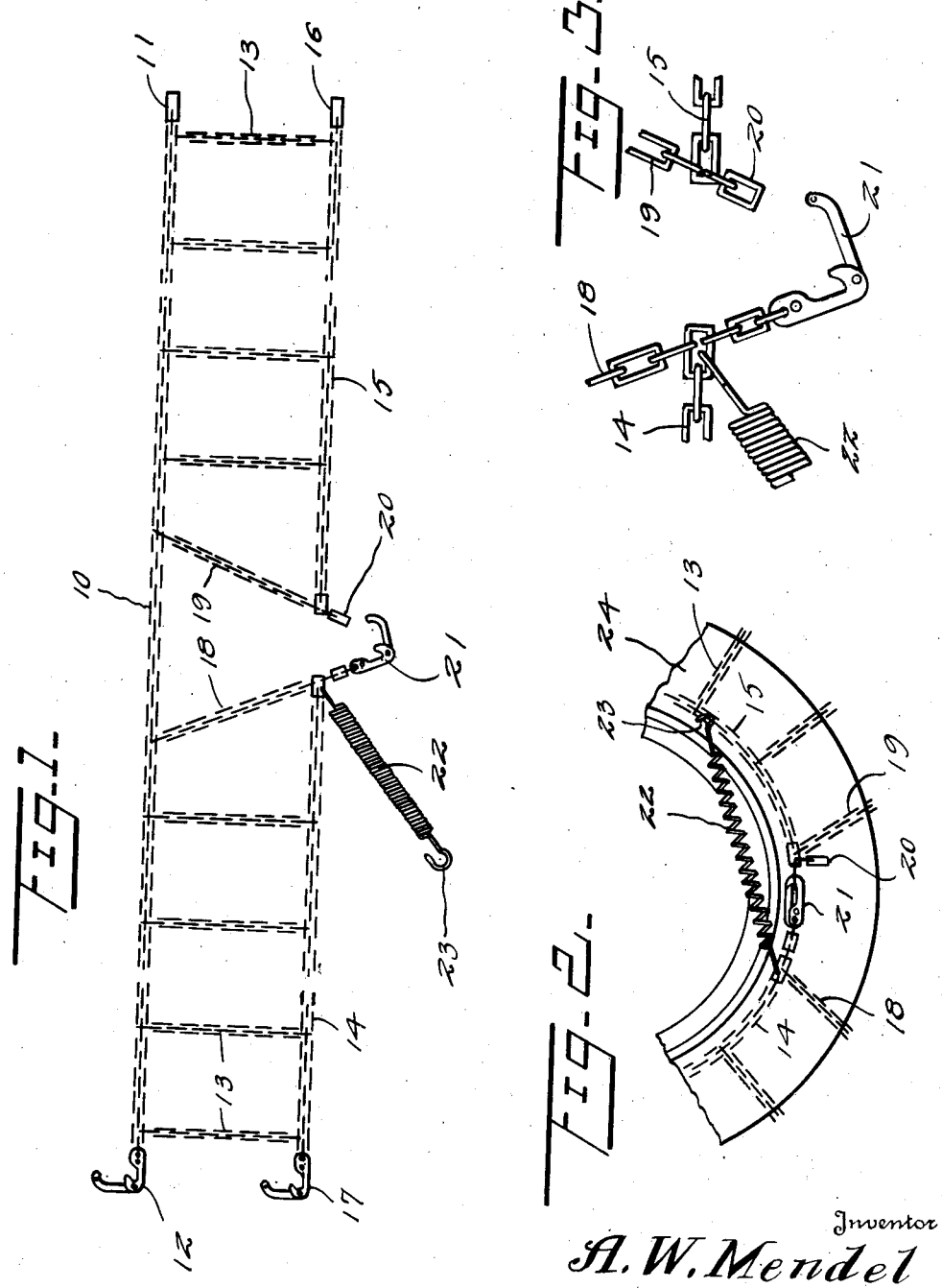
Inventor
A. W. Mendel
By Watson E. Coleman
Attorney Patented Aug. 29, 1933

1,924,286

UNITED STATES PATENT OFFICE 1,924,286

ANTISKID CHAIN

Albert W. Mendel, Pittsburgh, Pa.

Application March 24, 1932. Serial No. 600,991

2 Claims. (Cl. 152—14)

This invention relates to anti-skid tire chains and more particularly to a chain which is so constructed as to facilitate the attachment thereof on the tire.

An object of this invention is to provide an improved tire chain with means whereby the chain may be readily mounted on the tire without requiring the user of the device to extend a hand or arm beneath and behind the fender and wheel.

A further object of this invention is to provide a chain of this kind with means to facilitate the securing of the chain about the wheel so that it can be attached to the wheel even though a portion of the wheel be sunk in mud or soft earth.

The above and various other objects and advantages of this invention will in part be described in and in part be understood from the following detailed description of the present preferred embodiment, the same being illustrated in the accompanying drawing, wherein:—

Figure 1 is a diagrammatic plan view of a chain constructed according to the preferred embodiment of this invention.

Figure 2 is a fragmentary side elevation of a tire having a chain of this type mounted thereon.

Figure 3 is a fragmentary detail side elevation of the chain fastening means.

Referring to the drawing wherein like numerals of reference designate corresponding parts throughout the several views, the numeral 10 designates generally the inner side chain which is provided at one end with a ring 11 and at the opposite end with a locking member 12. A pair of outer side chain members 14 and 15 are secured in parallel relation to the inner side chain 10 by means of a plurality of cross chain members 13. The outer side chain 15 is provided with a ring 16 at one end and the side chain 14 is provided with a securing means 17 for engagement with the ring 16 when the chain is mounted on the wheel.

The inner ends of the outer side chain members 14 and 15 are disposed in spaced relation to each other, and a pair of outwardly converging cross chains 18 and 19 are secured at one end to the inner chain 10 and the cross chain 18 engages intermediate its ends the inner end of the outer side chain 14, while the converging cross chain 19 engages intermediate its ends the inner end of the outer side chain 15.

The cross chain 19 has a free link 20 and a securing or locking member 21 is attached to the opposite end of the cross chain 18, and is adapted to engage the link firmly so as to fasten the side chains 14 and 15 together and to form a continuous outer side chain when the device is mounted on the tire. A spring 22 has one end thereof engaged with the outer side chain 14 at the inner end thereof and this spring 22 is provided with a hook 23 for engagement with a selected link of the outer side chain 15, as shown in Figure 2, so as to maintain the entire chain structure on the wheel or tire in a taut condition.

The use of this spring 23 provides means whereby, in the event it is impossible to connect the locking member 21 with the link 20, the spring 23 may be engaged with a selected link of the outer side chain 15, thereby completing the circle of the outer side chain formed of the chain members 14 and 15, and permitting the wheel or tire 24 to be moved out of a hole or the like. This spring 23 also provides means whereby, in the event the chain sections 14 and 15 become twisted or otherwise distorted during the mounting operation, the wheel may be moved forwardly until the distortion is corrected, which will usually occur during one or more complete revolutions of the tire 24.

In the mounting and use of the anti-skid chain herein disclosed, the chain may be placed adjacent the periphery of the tire or wheel on which it is to be mounted and the cross chains 13 stretched out so that the inner side chain 10 will be parallel with the outer side chains 14 and 15. The chain section 15 may be folded on top of a portion of the chain 14 with the free end 16 facing the wheel or tire and the free end 11 also facing the tire. A hook or other means may then be attached to the free end of the cross chain facing the tire and the chain section including the outer side chain 15 with the cross chains 13 connecting this side chain with the inner side chain pulled along the inner face of the wheel so that that portion of the wheel engaged with the ground will be disposed between the two converging cross chains 18 and 19. The inner side chain 10 may then be connected by connecting the locking member 12 with the link 11, this being accomplished by pulling the two free ends of the inner side chain 10 up over the top of the tire and on the outer side of the tire.

When properly connected, the inner side chain 10 may then be placed on the inner face of a tire and the end portion 16 of the outer side chain 15 connected with the end portion 17 of the side chain 14. In the event there are no kinks in the side chains 14 and 15, the connector 21 may be attached to the link 20, thereby completing the circle of the outer side chain. The spring 22 may then be secured through the hook 23 to a selected link of the side chain 15 so that this spring 22 will be placed under tension, as shown in Figure 2, and this tension will automatically maintain the skid chain herein disclosed in a taut condition on the periphery of the tire.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An anti-skid chain comprising an inner side chain, a pair of outer side chains having their inner ends spaced apart, cross chains connecting the inner and outer side chains together, a pair of outwardly convergent cross chains having one end thereof secured to the inner side chain and the opposite end free and extending beyond the outer side chains, the inner ends of the outer side chains being secured to said convergent chains intermediate the ends of said convergent chains, means carried by the free end of one convergent chain to secure the ends of the convergent chains together, and a spring carried by one of the outer side chains and having a loop integral with one end engaging a link of said one outer side chain and having a hook integral with the other end for detachably engaging the other outer side chain whereby to maintain the chain in taut condition on a tire.

2. An anti-skid chain comprising an inner side chain, a pair of outer side chains having their inner ends spaced apart, securing means carried by the outer ends of the inner and outer side chains to secure said outer ends together, cross chains connecting the inner and outer side chains together, said cross chains being disposed in parallel relation to each other, a pair of outwardly convergent cross chains having the inner end thereof secured to the inner side chain, said convergent chains having a length greater than the distance between the inner and the outer side chains, the inner ends of said outer side chains being secured to the convergent chains intermediate the ends of said convergent chains, coacting securing means carried by the free ends of the convergent chains to secure said ends together, and a spring carried by one of the outer side chains and having a loop integral with one end engaging a link of said one outer side chain and having a hook integral with the other end for detachably engaging the other outer side chain whereby to maintain the chain in taut condition on a tire.

ALBERT W. MENDEL.